United States Patent [19]

Eckle

[11] Patent Number: 4,581,811

[45] Date of Patent: Apr. 15, 1986

[54] TOOL CHANGE APPARATUS FOR A MACHINE TOOL

[75] Inventor: Otto Eckle, Loechgau, Fed. Rep. of Germany

[73] Assignee: Komet Stahlhalter- und Werkzeugfabrik Robert Breuning GmbH, Besigheim, Fed. Rep. of Germany

[21] Appl. No.: 713,074

[22] Filed: Mar. 15, 1985

[30] Foreign Application Priority Data

Apr. 19, 1984 [EP] European Pat. Off. ........ 84104460.5

[51] Int. Cl.⁴ ............................................. B23Q 3/157
[52] U.S. Cl. ........................................ 29/568; 414/729
[58] Field of Search .................. 29/568, 26 A; 901/41, 901/30; 414/744 A, 729, 736; 279/7

[56] References Cited

U.S. PATENT DOCUMENTS

| | | | |
|---|---|---|---|
| 3,722,711 | 3/1973 | Seidel | 29/568 X |
| 3,817,541 | 6/1974 | Grabher | 29/568 X |
| 4,300,278 | 11/1981 | Nomura et al. | 29/568 |
| 4,338,709 | 7/1982 | Straub et al. | 29/26 A |
| 4,384,397 | 5/1983 | Nelson | 29/568 |

Primary Examiner—William R. Briggs
Attorney, Agent, or Firm—Flynn, Thiel, Boutell & Tanis

[57] ABSTRACT

In a tool change apparatus for a machine tool, a tool holder receiving means (3) is provided on the machine tool. A tool holder which is provided with a cylindrical portion for engagement of the change arm can be fitted into the tool holder receiving means (3), in the axial direction of the cylindrical portion. A radially extending screwthreaded bore (16) is provided in the cylindrical portion (4a). Provided at the free end of the change arm is a change head (17) which is movable radially with respect to the axis (S) of the cylindrical portion (4a) and which is provided at its outer end that is towards the tool holder (4) with a prism-shaped centering recess (18). Provided in the change head (17) is a connecting pin (19) which extends in the center of the centering recess (18) in the radial direction of movement (V) of the change head (17) and which can be driven by motor means in two opposite directions of rotation and which is limitedly displaceable in its axial direction in the change head (17) and which at its free end is provided with a male screwthread (19c) fitting into the screwthreaded bore (16).

6 Claims, 2 Drawing Figures

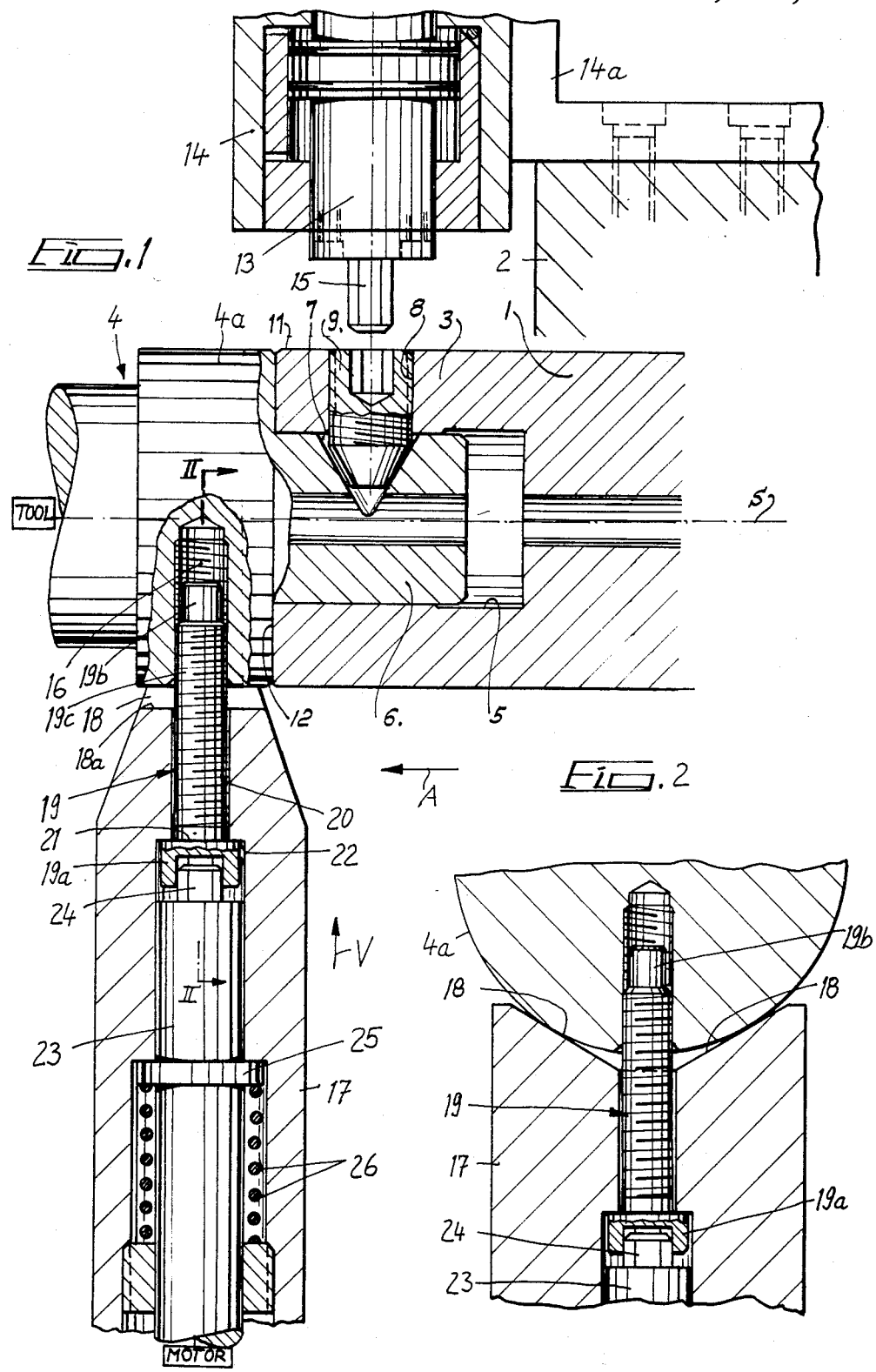

TOOL CHANGE APPARATUS FOR A MACHINE TOOL

FIELD OF THE INVENTION

The invention relates to a tool change apparatus for a machine tool, comprising a tool holder receiving means which is provided on the machine tool, more particularly a spindle, a tool holder which can be fitted into the tool holder receiving means and which carries a tool, a change arm which engages the tool holder in the tool change operation, and an automatic actuating means which actuates a clamping means for connecting the tool holder to the tool holder receiving means, wherein the tool holder has a cylindrical portion for engagement of the change arm and can be fitted into the tool holder receiving means in the axial direction of said cylindrical portion.

BACKGROUND OF THE INVENTION

In a known tool change apparatus of that kind (German published specification (DE-AS) No. 16 52 699), two change arms are provided in diametrally opposite relationship on a common pivotal shaft. At its end, each of the change arms has a semicylindrical bearing shell, the inside diameter of which approximately corresponds to the outside diameter of the cylindrical portion. A locking bar which is movable substantially in the longitudinal direction of the change arm is arranged on the change arm, opposite the bearing shell. For the purposes of the tool change operation, the change arm is pivoted into the region of the tool holder receiving means, and partially embraces, with its semicylindrical shell, the cylindrical portion of the tool which is to be replaced. When that occurs, the locking bar is retracted against the force of a spring and, when the semicylindrical shell bears against the cylindrical portion, presses against the cylindrical portion at a location which is in opposite relationship to the semicylindrical shell. However, that kind of holding arrangement is not sufficiently precise if the tools to be changed are those whose tool holder fits with a very close fit into the tool holder receiving means.

In addition, the change arm is of comparatively large structural dimensions in the region of the semicylindrical shell so that the tools must be arranged at a substantial spacing from each other in a tool magazine into which they are transferred by the change arm. Consequently, the tool magazine is of comparatively large dimensions. So that the tool holder which is to be exchanged occupies, in its axial direction, a given position relative to the change arm and is not unintentionally displaced relative to the tool arm in the change operation, it is also necessary for shoulders to be provided in front of and behind the cylindrical portion, in the axial direction, with the diameter of the shoulders being smaller than the diameter of the cylindrical portion. Accordingly, on both sides of the semicylindrical shell, the change arm has portions which are also somewhat smaller in diameter than the diameter of the semicylindrical shell. The shoulders cause the tool holder to be weakened in its cross-section or, if a weakening in cross-section is to be avoided, the semicylindrical portion must be made of correspondingly larger diameter, which in turn makes it necessary for the tool holders to be arranged at even larger spacings from each other in the tool magazine.

The most usual type of tool change apparatuses operates with tongs-like grippers which are respectively provided at the end of the change arm. The tool holder has a flange in which a groove of trapezoidal cross-section is turned. The tongs of the gripper engage into the groove. In this construction also the connection between the gripping tongs members and the tool holder is comparatively lacking in accuracy. Furthermore, the tongs members and also the flange which is required suffer from the disadvantage which has already been mentioned above, namely that the tool holders must be arranged at comparatively large spacings from each other in the tool magazine.

The invention is therefore based on the problem of providing a tool change apparatus for a machine tool of the kind set forth in the opening part of this specification, which, while avoiding the above-mentioned disadvantages, permits a connection between the tool holder and the change arm to be made with a very high degree of positional accuracy, which is of a simple construction, which is of small dimensions even in the region in particular of the change head and wherein the tool holder does not need to have any portions of enlarged diameter for engagement of the change arm, so that the tool holders can be disposed in a tool magazine at minimum spacings from each other.

According to the invention, that problem is solved in that provided in the cylindrical portion is a radially extending screwthreaded bore, that provided at the free end of the change arm is a change head which is movable radially with respect to the axis of the cylindrical portion and which is provided with a prism-shaped centering recess at its outer end which is towards the tool holder, and that provided in the change head is a connecting pin which extends in the centre of the centering recess in the radial direction of movement of the change head and which can be driven by motor means in two opposite directions of rotation and which is limitedly displaceable in its axial direction in the change head and which is provided at its free end with a male screwthread which fits into the screwthreaded bore.

The tool change apparatus according to the invention permits the connection made between the tool holder and the change head to have a very high degree of positional accuracy for the two components are fixedly screwed together by means of the connecting pin in the too change operation. In that respect, the positional accuracy as between the two components is also decisively ensured by the prism-shaped recess in the change head.

There is also the advantage that the tool holder only has to have the cylindrical portion and does not have to have any further portions which project beyond the diameter of the cylindrical portion or also portions which are of smaller diameter, for engagement of the change arm. As moreover the change head engages the tool holder only from one side, there is no need to provide space for the change arm or parts thereof, laterally beside the tool holder, when fitting the tool holder into a tool magazine or into the tool holder receiving means. Consequently, the tool holders can be disposed at very small spacings from each other in the magazine, and the pitch or partitioning of the magazine only needs to be immaterially larger than the diameter of the cylindrical portion.

In addition, the tool holder is not weakened by any grooves or shoulders, to that the tool holder is extremely strong. By virtue of the connection between the change head and the tool holder providing a high degree of positional accuracy, it is also readily possible to change tool holders which are fitted into a tool holder receiving means, with a very close fit. In addition, the novel tool change apparatus can be used for all systems for making a connection between the tool holder and the tool holder receiving means.

BRIEF DESCRIPTION OF THE DRAWINGS

The invention will now be described in greater detail with reference to an embodiment as illustrated in the drawing in which:

FIG. 1 is a view of the embodiment in longitudinal section, and

FIG. 2 is a view in cross-section taken along line II—II in FIG. 1.

DETAILED DESCRIPTION

The connection between the tool holder and the tool holder receiving means will be described hereinafter, with reference to a machine tool spindle 1 which forms the tool holder receiving means.

The machine tool spindle 1 is mounted rotatably in the headstock 2. At its forward free end, the spindle has a tool holder receiving means 3 for receiving the tool holder 4. At its free end (which is not shown but which is at the left in FIG. 1), the tool holder 4 carries a tool, for example a drilling head, an inside turning tool, a milling tool, a reamer or the like, which are fixedly or replaceably connected to the tool holder 4, possibly also with the interposition of intermediate members. The tool holder 4 has a cylindrical shank portion which fits into the receiving bore 5 in the tool holder receiving means 3, with a very small amount of play (virtually without play). A conical bore 7 is provided in the cylindrical shank portion 6. The tool holder receiving means 3 has a radially extending female screwthread 8 into which a respective clamping screw 9 is screwed. The clamping screw 9 engages by way of a conical portion 10 into the conical bore 7 in the shank portion 6. The axes of the clamping screw 9 and the bore 7 are displaced relative to each other in such a way that, when the clamping screw 9 is tightened, the annular surface 11 on the tool holder 4 is pressed against the end face 12 of the spindle 1.

For the purposes of changing the tool therefore, the clamping screw 9 has to be released and tightened. So that that operation can be carried out automatically, the spindle 1 must be stopped so that the clamping screw 9 is always at the same location. Provided as an actuating means for the clamping screw 9 is a screwdriver 13 which is displaceable in the housing 14 in the direction of the axis of the clamping screw. The housing 14 is fixedly connected to the headstock 2 by way of a mounting arrangement 14a. At its free end, the screwdriver 13 has an entrainment member 15 which fits into the clamping screw 9. In addition, the screwdriver 13 can be driven about its axis in two opposite directions of rotary movement, by an electric motor (not shown).

Also provided on the tool holder 4 is a cylindrical portion 4a which has a screwthreaded bore 16 extending radially with respect to the axis S of the cylindrical portion 4a.

Disposed at the free end of a change arm (not shown) which is movable in a direction V radially with respect to the axis S of the cylindrical portion 4a is a change head 17 which has a prismshaped centering recess 18 at its end which is towards the tool holder 4. The apex line 18a of the recess 18 extends parallel to the axis S.

Provided in the centre of the centering recess 18, that is to say, in the region of the line 18a, is a connection pin which extends in the direction of the radial direction of movement V of the change head 17. The connecting pin 19 is mounted in a bore 20 in the change head 17, for limited displacement radially with respect to the cylindrical portion 4a. The connecting pin 19 which, in the illustrated embodiment, is in the form of a socket-head screw, has a shoulder 21 which is formed by its head 19a. Adjoining the bore 20 is an annular step 22 for limiting the displacement of the connecting pin 19 towards the centering recess 18.

At its free end, the connecting pin 19 has a cylindrical projecting guide portion 19b which is somewhat smaller in diameter than the inside diameter of the screwthreaded bore 16. In other respects, the male screwthread 19c on the connecting pin 19 fits into the screwthreaded bore 16. Also disposed in the change head 17 coaxially with respect to the connecting pin 19 is the shank 23 of a screwdriver which can be driven in two opposite directions of rotation by motor means. The shank 23 engages by means of an entrainment member 24 into the head 19a of the screw. The shank 23 also has a collar 25 against which a compression spring 26 bears. The compression spring 26 loads the shank 23 and thus also the connecting pin 19 towards the outer end of the change head 17 so that the connecting pin 19 and thus also the shank 23 are displaceable into the change head 17, against the force of the spring 26.

The connecting pin 19 and the shank 23 could possibly also comprise one piece, in which case the spring 26 would be diposed at a suitable location.

For the purposes of a tool change operation, the spindle 1 is stopped so that the clamping screw 9 is disposed in opposite relationship to the entrainment member 15. The change head 17 is moved by the change arm radially relative to the axis S in the direction indicated by V, the free end of the connecting pin 19 projecting beyond the centering recess 18 under the force of the spring 26. The centering recess 18 is brought to bear against the cylindrical portion 4a, in which case initially only the cylindrical portion 19b of the connecting pin 19 passes into the screwthreaded bore 16. Moreover, the connecting pin 19 is pushed into the change head 17 against the force of the spring 26. When now the screwdriver shank 23 is driven in the clockwise direction, the connecting pin is screwed with its male screwthread 19c into the screwthreaded bore 16 until its shoulder 21 comes to bear against the annular step 22. The tool holder 4 and the change head 17 are then connected together in a positionally accurate manner by way of the connecting pin 19.

The screwdriver shank 13 with its entrainment member 15 is moved into the clamping screw 9 by compressed air and is then driven in the anti-clockwise direction. That causes the clamping screw 9 to be screwed radially outwardly, and the clamping connection between the tool holder 4 and the tool holder receiving means 3 is thus released.

The change head 17 with the tool holder 4 screwed thereon is now moved in the direction indicated by A until the cylindrical shank 6 has passed completely out of the receiving bore 5. The tool holder 4 which is to be changed can now be moved out of the region of the spindle by moving the change head 17 in the opposite direction to the direction indicated by the arrow V, and a subsequent pivotal movement. In the meantime, a change head 17 which is of identical configuration and which is disposed on the change arm in diametrally opposite relationship to the change head illustrated is connected, in the region of the tool magazine, to another tool holder which is now pivoted into the region of the spindle 1 and moved radially in the direction V. As soon as the axis of the shank 6 is aligned with the axis of the receiving bore 5, the change head 17 is displaced in the opposite direction to the arrow A, whereby the shank 6 is fitted into the receiving bore 5. Then, the clamping screw 9 is re-tightened by means of the screwdriver 13 and the connecting pin 19 is unscrewed from the screwthreaded bore 16. The change operation is completed after the change head 17 is retracted, in the opposite direction to the direction indicated by the arrow V.

The novel tool change apparatus can also be used for any other systems for making a connection between the tool holder and the tool receiving means, for the only important consideration is that, adjacent its part which engages into the tool holder receiving means, the tool holder must have a cylindrical portion which can be engaged by the prism-shaped centering recess and the connecting pin of the change head. Thus for example the cylindrical shank which can be fitted into the tool holder receiving means can also be connected to the tool receiving means by another clamping screw arrangement. It is also possible for the part of the tool holder which engages into the tool holder receiving means to be of a conical or tapered configuration.

The embodiments of the invention in which an exclusive property or privilege is claimed are defined as follows:

1. A tool change apparatus for a machine tool, comprising a tool holder receiving means which is provided on a spindle, a tool holder which can be fitted into said tool holder receiving means and which carries a tool, a change arm which engages said tool holder in a tool change operation, and an automatic actuating means which actuates a clamping means for connecting said tool holder to said tool holder receiving means, wherein said tool holder has a cylindrical portion for engagement of said change arm and can be fitted into said tool holder receiving means in the axial direction of said cylindrical portion, wherein provided in said cylindrical portion is a radially extending screwthreaded bore, wherein provided at the end of said change arm is a change head which is movable radially with respect to an axis of said cylindrical portion and which is provided with a prism-shaped centering recess at its outer end which is towards said tool holder, and wherein provided in said change head is a connecting pin which extends in the center of said centering recess in the radial direction of movement of said change head and which can be driven by motor means in two opposite directions of rotation and which is limitedly displaceable in its axial direction in said change head and which is provided at its free end with a male screwthread which fits into said screwthreaded bore.

2. A tool change apparatus according to claim 1, wherein said connecting pin has a shoulder and wherein said change head is provided with an annular step for limiting the displacement of said connecting pin in a direction towards said centering recess.

3. A tool change apparatus according to claim 1, wherein at its free end said connecting pin is provided with a cylindrical projecting guide portion whose diameter is somewhat smaller than the inside diameter of said screwthreaded bore.

4. A tool change apparatus according to claim 1 wherein said connecting pin is displaceable into said change head against a spring force.

5. A tool change apparatus according to claim 1, wherein disposed in said change head coaxially with respect to said connecting pin is a shank of a screwdriver which can be driven by motor means in two opposite directions of rotary movement and which is provided at its end which is towards said connecting pin with an entrainment member with which it engages into a head of a socket-head screw provided as said connecting pin.

6. A tool change apparatus according to claim 5 wherein said shank of said screwdriver is displaceable in said change head against a spring force.

* * * * *